US011130236B2

(12) United States Patent
Chen et al.

(10) Patent No.: US 11,130,236 B2
(45) Date of Patent: Sep. 28, 2021

(54) ROBOT MOVEMENT TEACHING APPARATUS, ROBOT SYSTEM, AND ROBOT CONTROLLER

(71) Applicant: FANUC CORPORATION, Yamanashi (JP)

(72) Inventors: Wenjie Chen, Yamanashi (JP); Kaimeng Wang, Yamanashi (JP); Tetsuaki Kato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 273 days.

(21) Appl. No.: 16/293,965

(22) Filed: Mar. 6, 2019

(65) Prior Publication Data
US 2019/0321983 A1    Oct. 24, 2019

(30) Foreign Application Priority Data

Apr. 18, 2018    (JP) .............................. JP2018-079583

(51) Int. Cl.
*B25J 9/16*    (2006.01)
*B25J 9/00*    (2006.01)

(52) U.S. Cl.
CPC ........... *B25J 9/1697* (2013.01); *B25J 9/0084* (2013.01); *B25J 9/1633* (2013.01); *B25J 9/1664* (2013.01); *B25J 9/1651* (2013.01); *B25J 9/1694* (2013.01)

(58) Field of Classification Search
CPC . G06K 9/00355; G06K 2209/19; B25J 13/00; B25J 13/08; Y10S 901/04;
(Continued)

(56) References Cited

U.S. PATENT DOCUMENTS 7,714,895 B2 *   5/2010   Pretlove ............... G05B 19/427
                                                      348/211.2
9,052,710 B1 *   6/2015   Farwell ................. B25J 9/1656
(Continued)

FOREIGN PATENT DOCUMENTS

JP    S60-205721 A    10/1985
JP    H05-197416 A    8/1993
(Continued)

OTHER PUBLICATIONS

Japanese Office Action dated May 26, 2020, in connection with corresponding JP Application No. 2018-079583 (7 pgs., including machine-generated English translation).
(Continued)

*Primary Examiner* — Abby Y Lin
*Assistant Examiner* — Dylan M Katz
(74) *Attorney, Agent, or Firm* — Maier & Maier, PLLC

(57)    ABSTRACT

A robot movement teaching apparatus including a movement path extraction unit configured to process time-varying images of a first workpiece and fingers or arms of a human working on the first workpiece, and thereby extract a movement path of the fingers or arms of the human; a mapping generation unit configured to generate a transform function for transformation from the first workpiece to a second workpiece worked on by a robot, based on feature points of the first workpiece and feature points of the second workpiece; and a movement path generation unit configured to generate a movement path of the robot based on the movement path of the fingers or arms of the human extracted by the movement path extraction unit and based on the transform function generated by the mapping generation unit.

7 Claims, 4 Drawing Sheets

(58) Field of Classification Search
CPC .......... G05B 2219/36442; G05B 2219/39451; G05B 2219/35444; G05B 2219/35464
See application file for complete search history.

(56) References Cited

U.S. PATENT DOCUMENTS

| | | | |
|---|---|---|---|
| 2015/0051735 A1* | 2/2015 | Tanaka | B25J 9/1638 700/262 |
| 2015/0314442 A1 | 11/2015 | Boca et al. | |
| 2016/0016308 A1* | 1/2016 | Kanazawa | B25J 9/1607 700/263 |
| 2016/0059407 A1 | 3/2016 | Sonoda | |
| 2016/0243704 A1* | 8/2016 | Vakanski | B25J 9/1697 |
| 2017/0113343 A1 | 4/2017 | Inaba | |
| 2018/0020978 A1* | 1/2018 | Kaifosh | G16H 50/50 702/150 |
| 2018/0050452 A1 | 2/2018 | Ou et al. | |
| 2018/0290302 A1 | 10/2018 | Wang et al. | |
| 2018/0341828 A1 | 11/2018 | Wang et al. | |
| 2018/0345491 A1 | 12/2018 | Iwamoto | |

FOREIGN PATENT DOCUMENTS

| | | | | |
|---|---|---|---|---|
| JP | 2008-207262 A | 9/2008 | | |
| JP | 4410208 B | 2/2010 | | |
| JP | 2016-047591 A | 4/2016 | | |
| JP | 6038417 B1 * | 12/2016 | | B25J 9/163 |
| JP | 2017-077606 A | 4/2017 | | |
| JP | 2018-027580 A | 2/2018 | | |
| JP | 2018-176332 A | 11/2018 | | |
| JP | 2018-200558 A | 12/2018 | | |
| WO | 2017/130389 A1 | 8/2017 | | |

OTHER PUBLICATIONS

Japanese Search Repod dated Apr. 27, 2020, in connection with corresponding JP Application No. 2018-079583 (18 pgs., including machine-generated English translation).

C. Liu, et al., "Realtime trajectoryoptimization fornonlinear roboticsystems: Relaxationand convexification". Systems & Control-Letters, 108 (2017), p. 56-63; 8 pages.

* cited by examiner

FIG. 3
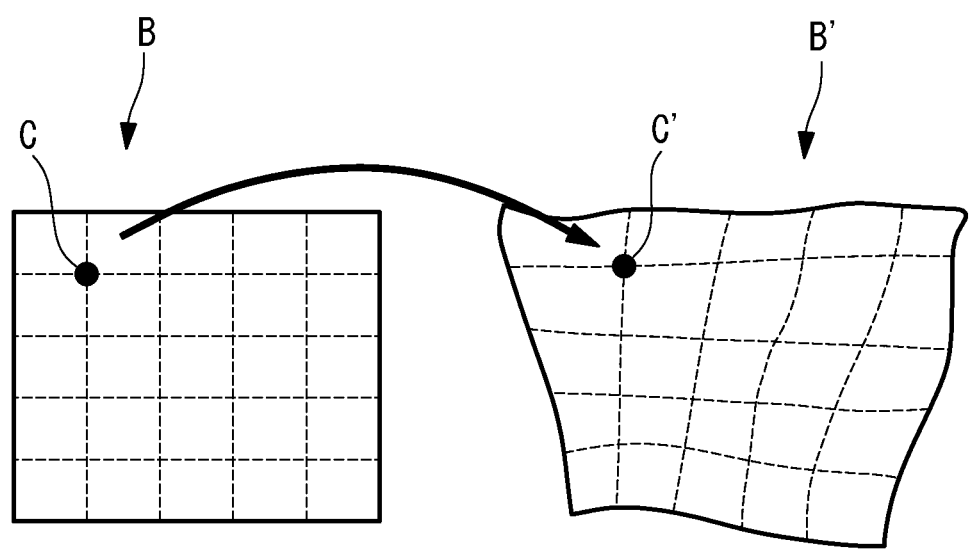
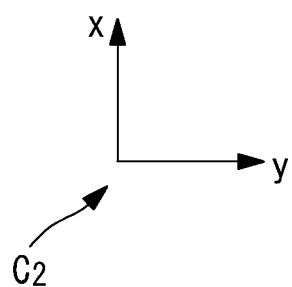

ROBOT MOVEMENT TEACHING APPARATUS, ROBOT SYSTEM, AND ROBOT CONTROLLER

CROSS-REFERENCE TO RELATED APPLICATIONS

This application claims the benefit of Japanese Patent Application No. 2018-079583, the content of which is incorporated herein by reference.

FIELD

The present invention relates to a robot movement teaching apparatus, a robot system, and a robot controller.

BACKGROUND

Movement teaching apparatuses have been known that cause robots to imitate human manual working (e.g., Japanese Unexamined Patent Application, Publication No. 60-205721).

The movement teaching apparatus in Japanese Unexamined Patent Application, Publication No. 60-205721 uses multiple cameras to obtain time-series data about multiple three-dimensional positions corresponding to the movements of the arms, hands, and fingertips of a human working on an object or the movements of the object being worked on. The movement teaching apparatus also uses sensors attached to the hands and fingertips of the human to detect the force applied to the object being worked on and obtain time-series data about the force. The apparatus transforms the two time-series data sets obtained for the same period of time into shaft locus data corresponding to the movements of the joint shafts of multiple robot arms.

SUMMARY

An aspect of the present invention is a robot movement teaching apparatus including: a movement path extraction unit configured to process time-varying images of a first workpiece and fingers or arms of a human working on the first workpiece, and thereby extracts a movement path of the fingers or arms of the human; a mapping generation unit configured to generate a transform function for transformation from the first workpiece to a second workpiece worked on by a robot, based on feature points of the first workpiece and feature points of the second workpiece; and a movement path generation unit configured to generate a movement path of the robot based on the movement path of the fingers or arms of the human extracted by the movement path extraction unit and based on the transform function generated by the mapping generation unit.

BRIEF DESCRIPTION OF DRAWINGS

FIG. 3 illustrates transform-function generation processing by a mapping generation unit included in the movement teaching apparatus in FIG. 2.

DETAILED DESCRIPTION

A robot movement teaching apparatus 10 and a robot system 1 according to an embodiment of the present invention will now be described with reference to the drawings.

Figure 1:
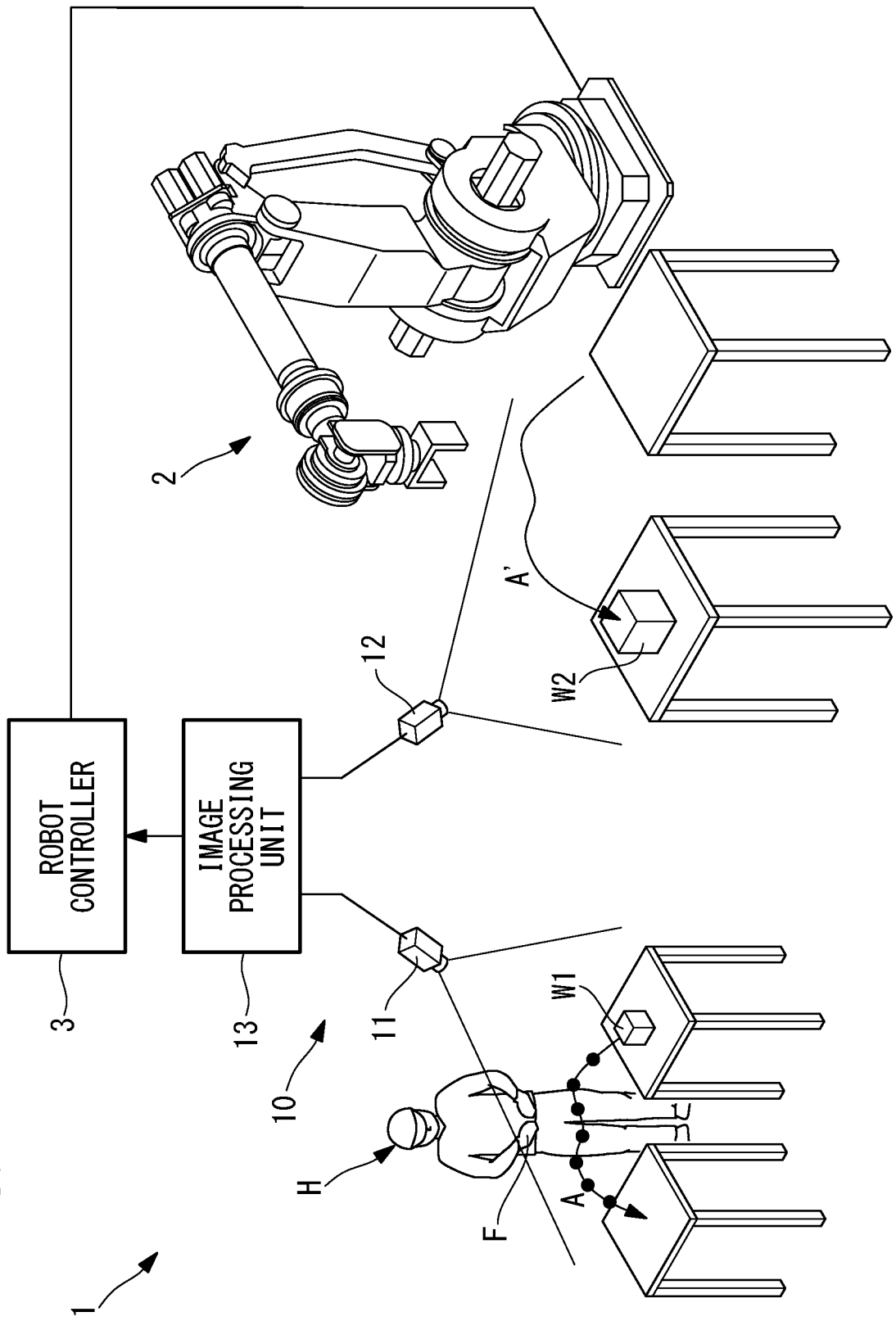
FIG. 1 illustrates the whole configuration of a robot system according to an embodiment of the present invention.

As illustrated in FIG. 1, the robot system 1 according to the present embodiment includes a robot 2, a robot controller connected to the robot 2, and the movement teaching apparatus 10 according to the present embodiment, connected to the robot controller 3.

The movement teaching apparatus 10 includes a first camera (first visual sensor) 11 that captures time-varying images of a first workpiece W1 and fingers F of a human H when the human H works on the first workpiece W1, a second camera (second visual sensor) 12 that captures images of a second workpiece W2 worked on by the robot 2, and an image processing unit 13 that is connected to the first camera 11 and the second camera 12.

Figure 2:
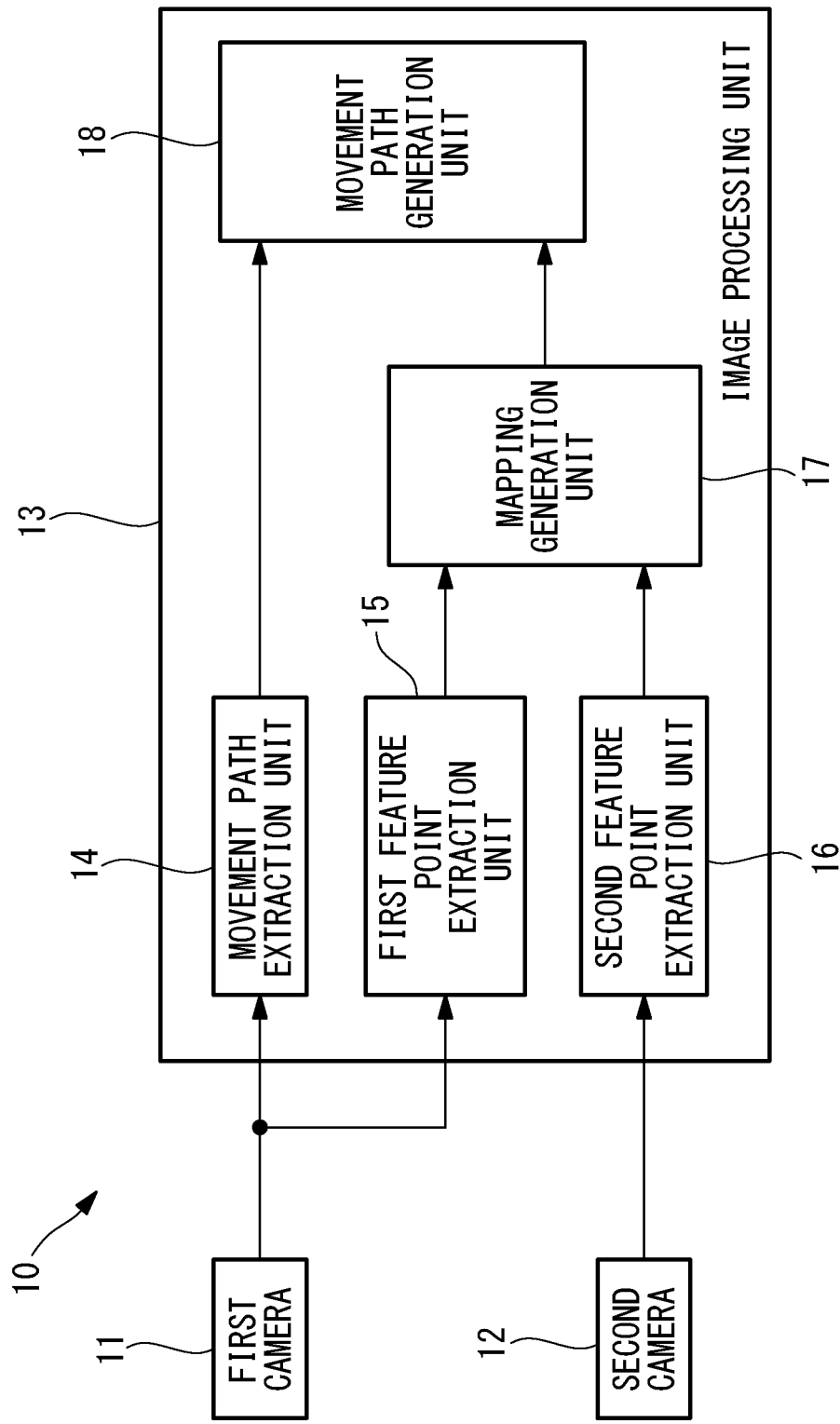
FIG. 2 is a block diagram of a movement teaching apparatus included in the robot system in FIG. 1.

As illustrated in FIG. 2, the image processing unit 13 includes a movement path extraction unit 14 connected to the first camera 11, a first feature point extraction unit 15 connected to the first camera 11, a second feature point extraction unit 16 connected to the second camera 12, a mapping generation unit 17 connected to the first feature point extraction unit 15 and the second feature point extraction unit 16, and a movement path generation unit 18 connected to the movement path extraction unit 14 and the mapping generation unit 17.

The movement path extraction unit 14 extracts the movement path of the fingers F of the human H from the images obtained by the first camera 11. More specifically, with markers on the fingers F of the human H, a known motion capture technique is used to extract the motion trail of the markers from the time-varying images obtained by the first camera 11.

The first feature point extraction unit 15 performs image processing to extract the first workpiece W1 in any one of the images obtained by the first camera 11, and extracts the coordinates of multiple feature points such as vertexes and edges.

The second feature point extraction unit 16 performs image processing to extract the second workpiece W2 in any one of the images obtained by the second camera 12, and extracts the coordinates of multiple feature points such as vertexes and edges.

The mapping generation unit 17 calculates a transform function f using mapping theoretical formula (1) below, based on the coordinates of the feature points extracted by the first feature point extraction unit 15 and the coordinates of the feature points extracted by the second feature point extraction unit 16.

$$f = \arg\min_f \sum_k \left\| f(x^{(k)}) - x^{(k)'} \right\|^2 + \int_{x_1}\int_{x_2}\left[\left(\frac{\partial^2 f}{\partial x_1^2}\right)^2 + 2\left(\frac{\partial^2 f}{\partial x_1 \partial x_2}\right)^2 + \left(\frac{\partial^2 f}{\partial x_2^2}\right)^2\right]dx_1\,dx_2 \quad (1)$$

where reference character f denotes the transform function, k denotes the number of feature points of the first workpiece W1, $x^{(k)}$ denotes the coordinates of the k-th feature point, $x_1$ and $x_2$ for a two-dimensional figure denote the coordinates $(x_1, x_2)$ on a two-dimensional coordinate system, $x^{(k)'}$ denotes the coordinates of the k-th feature point of the second workpiece W2, and $f(x^{(k)})$ denotes the coordinates on the second workpiece W2 onto which the k-th coordinates $x^{(k)}$ of the first workpiece W1 are mapped by a mapping function f.

This calculation method will now be described with reference to FIG. 3. FIG. 3 illustrates a rectangular shape B and a shape B' as an example. The shape B is the shape of the first workpiece W1 and the shape B' is the shape of the second workpiece W2, different from the shape of the first workpiece W1.

In FIG. 3, a point C is defined at a freely selected position on the first workpiece W1. The shape B of the first workpiece W1, the shape B' of the second workpiece W2, and the point C are represented as coordinates on a coordinate system $C_2$ in FIG. 3.

FIG. 3 shows a point C', which is the position on the shape of the second workpiece W2 corresponding to the position of the point C on the shape of the first workpiece W1. If the coordinates of the shape B of the first workpiece W1 and the shape B' of the second workpiece W2 are known on the coordinate system $C_2$, the position of the point C' (i.e., the coordinates on the coordinate system $C_2$) can be calculated by substituting these coordinates into the transform function f of formula (1).

The movement path generation unit 18 uses such a calculation method to calculate the movement path for the shape B' of the second workpiece W2 corresponding to the movement path of the fingers F of the human H obtained for the shape B of the first workpiece W1. More specifically, in the coordinate system in FIG. 1, the movement path generation unit 18 can calculate a movement path A' of the robot 2 for the second workpiece W2 by substituting into the transform function f, a movement path A of the fingers F of the human H for the first workpiece W1 extracted by the movement path extraction unit 14.

When the robot controller 3 receives the movement path A from the movement path generation unit 18, the robot controller 3 multiplies the coordinates of the points of the movement path A by a coordinate transform matrix (e.g., a Jacobian matrix) to transform the coordinates of the movement path A into coordinates on the three-dimensional robot coordinate system. The resultant coordinates may be used as teaching points to move the robot 2 in accordance with the movement path A'.

The movement teaching apparatus 10 and the robot system 1 according to the present embodiment transform the movement path A of the fingers F of the human H obtained by a motion capture technique into the movement path A' of the robot 2. The movement teaching apparatus 10 and the robot system 1 can thus shorten the period of time for teaching a complicated movement path A compared with a technique that uses a teach pendant. The teaching human H can advantageously teach the movement path A by intuitive movements. In addition, advantageously, the teaching human H may not be skilled unlike a technique that uses a teach pendant.

In the movement teaching apparatus 10 and the robot system 1 according to the present embodiment, even if the first workpiece W1 worked on by the human H and the second workpiece W2 worked on by the robot 2 do not have the identical shape, the mapping generation unit 17 generates a transform function that enables the movement path A of the fingers F of the human H to be transformed into the movement path A' of the robot 2 based on the difference in the shapes of the workpieces W1 and W2.

For example, even if the first workpiece W1 and the second workpiece W2 are similar in shape or different in one dimension, the movement path A' of the robot 2 can be generated with accuracy. This advantageously allows the human H to easily teach movements to the robot 2 based on intuitive manual working, improving the manufacturing efficiency.

In addition, advantageously, accurate CAD data may not be created unlike teaching with a computer simulation.

The present embodiment may also include a locus optimization unit (not shown) that optimizes the movement path A' of the robot 2 generated by the movement path generation unit 18. The locus optimization unit may perform the processing of optimizing the movement path A' using, for example, the technique described in Changliu Liu, Masayoshi Tomizuka, Real time trajectory optimization for non-linear robotics systems: Relaxation and convexification, Systems & Control Letters 108 (2017), p. 56 to 63.

The optimization processing optimizes the locus after locus planning for avoiding an obstacle. In the locus planning, the evaluation function and the restrictive conditions represented by formulas (2) to (5) below are used to determine a locus that maintains a predetermined distance from the obstacle with low motor torque and a small amount of change from the generated movement path A'.

$$\min_{x,u} J(x, u) = \omega_1 \|x - x^r\|_Q^2 + \omega_2 \|u\|_R^2 \quad (2)$$

$$x_t \in X, u_t \in U \quad (3)$$

$$x_t = f(x_{t-1}, u_{t-1}) \quad (4)$$

$$d(x_t, O_t) \geq d_{min}, \forall t = 1, \ldots, N \quad (5)$$

Formula (2) represents an evaluation function $J(x, u)$ for the locus planning and determines the locus x and the torque u that minimize the sum of the squared norm of the amount of change from the predetermined movement path $x^r$ of the robot 2 ($x - x^r$) and the squared norm of the motor torque u, with predetermined weights $\omega_1$ and $\omega_2$ respectively assigned to the squared norms.

Formulas (3), (4), and (5) are restrictive conditions for formula (2).

Formula (4) is a dynamics model.

Formula (5) specifies the condition that the distance from the obstacle is greater than the minimum distance.

In the locus optimization, the evaluation function and the restrictive conditions represented by formulas (6) to (8) below are used to optimize the locus in a manner to reduce the movement time for movement along the movement path A' and also reduce the acceleration.

$$\min_{\tau,\alpha} J_T(\tau, \alpha) = \omega_3 \|\tau\|_1 + \omega_4 \|\alpha\|_R^2 \quad (6)$$

$$\tau > 0, \alpha \in A \quad (7)$$

$$g_T(\tau, \alpha) = 0 \quad (8)$$

Formula (6) represents an evaluation function $J_T(\tau, a)$ for the locus optimization and determines the movement time τ and the acceleration a that minimize the sum of the squared norm of the movement time τ and the squared norm of the acceleration a, with predetermined weights $\omega_3$ and $\omega_4$ respectively assigned to the squared norms.

Formulas (7) and (8) are restrictive conditions for formula (6), and formula (8) represents the relationship between the time and the acceleration.

The processing of optimizing the movement path A' enables the teaching of the movement path A' that allows fast movement without a collision with any near obstacle.

Figure 4:
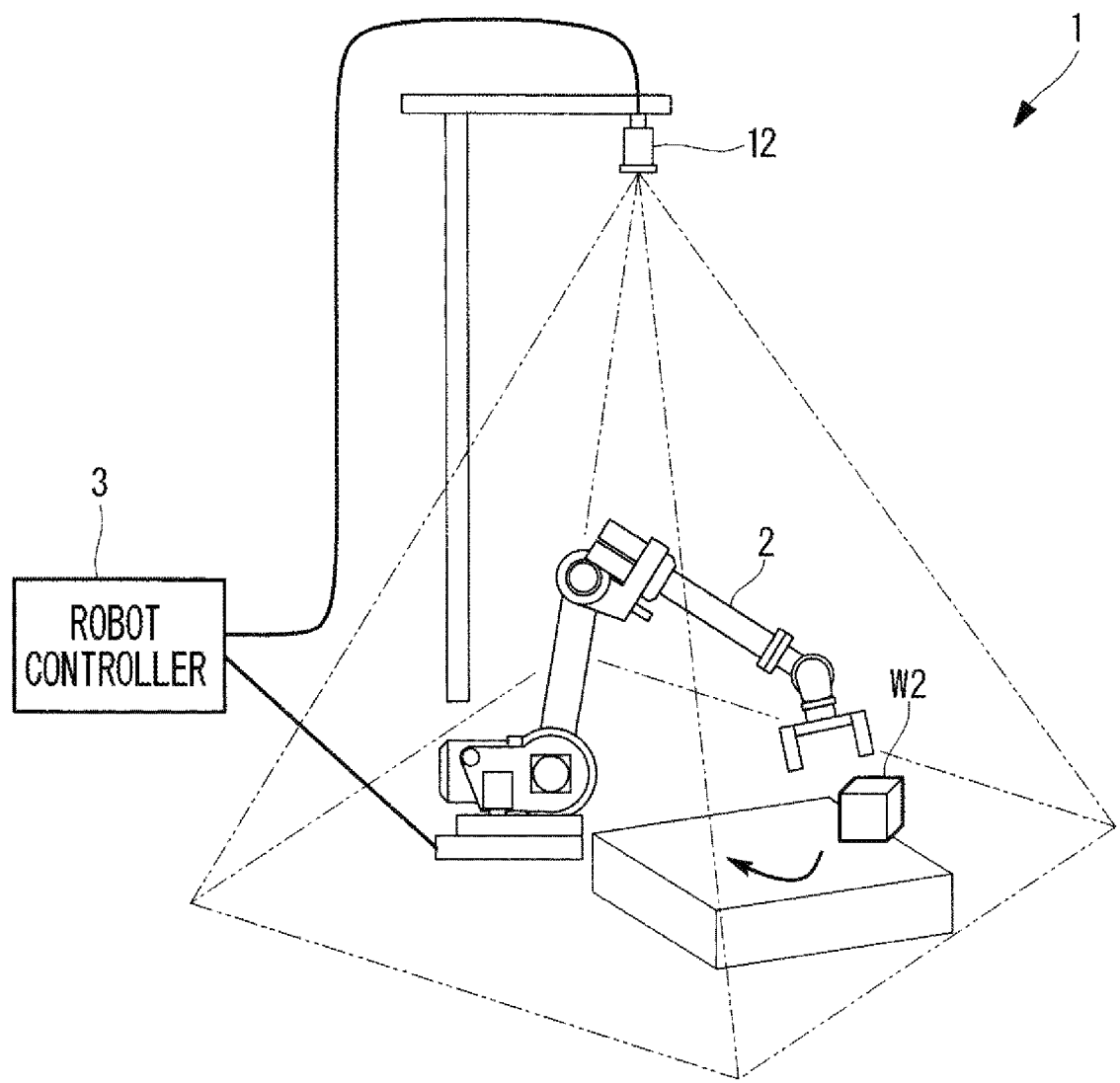
FIG. 4 illustrates the robot controller causing the robot to follow the second workpiece.

If the second workpiece W2 moves at random, for example, the robot controller disclosed in Japanese Unexamined Patent Application, Publication No. 2018-27580 may be used. More specifically, the second feature point extraction unit 16 may extract the positions of multiple feature points of the second workpiece W2 at predetermined intervals, and a position/posture calculation unit may update the equation of motion of each feature point at the same intervals based on the extracted positions of the feature points, and calculate the position or posture of the second workpiece W2 based on the position of each feature point calculated from the corresponding updated equation of motion. The robot 2 may be controlled based on the calculated position or posture of the second workpiece W2. This advantageously enables the robot 2 to accurately follow the second workpiece W2 moving at random, by visual servoing. Such a procedure is depicted in FIG. 4.

If the second workpiece W2 is something indefinite in shape such as a cable, an image obtained by the first camera 11 may be used to recognize the shape by simulation, and the mapping generation unit 17 may determine the transform function based on the recognized shape.

In the present embodiment, a known motion capture technique is used to extract the motion trail of markers from time-varying images obtained by the first camera 11 with the markers on the fingers F of the human H. Instead, the human H may work on the first workpiece W1 within a virtual reality (VR) space. This allows the movement path A of the fingers F of the human H to be extracted without providing a real work environment for the first workpiece W1 and the human H.

In addition, a storage unit may be included to store the feature points of the second workpiece W2 and the generated movement path A' of the robot 2 in association with each other. This improves the working efficiency by reading the movement path A' of the robot 2 from the storage unit when the second workpiece W2 is worked on again.

A robot system may be used that includes a plurality of robots 2, controllers that control the robots 2, a network connecting the controllers, and the movement teaching apparatus 10 including a storage unit connected to the network.

The robot system allows the controllers for the robots 2 to read the movement path A' of each robot 2 from the storage unit of the movement teaching apparatus 10 over the network based on the feature points of the second workpiece W2, and the robots 2 can advantageously share information among them.

From the above-described embodiment, the following invention is derived.

An aspect of the present invention is a robot movement teaching apparatus including: a movement path extraction unit configured to process time-varying images of a first workpiece and fingers or arms of a human working on the first workpiece, and thereby extract a movement path of the fingers or arms of the human; a mapping generation unit configured to generate a transform function for transformation from the first workpiece to a second workpiece worked on by a robot, based on feature points of the first workpiece and feature points of the second workpiece; and a movement path generation unit configured to generate a movement path of the robot based on the movement path of the fingers or arms of the human extracted by the movement path extraction unit and based on the transform function generated by the mapping generation unit.

According to this aspect, the movement path extraction unit processes the time-varying images of the first workpiece and the fingers or arms of the human working on the first workpiece, and thereby extracts the movement path of the fingers or arms of the human, and the mapping generation unit generates the transform function for transformation from the first workpiece to the second workpiece worked on by the robot, based on the feature points of the first workpiece and the feature points of the second workpiece. The movement path generation unit then generates the movement path of the robot based on the extracted movement path of the fingers or arms of the human and on the generated transform function. This process enables the manufacturing efficiency to be improved by easily teaching movements to the robot based on human manual working even in the case that the first workpiece manually worked on by the human and the second workpiece worked on by the robot are of different types.

In the above aspect, the apparatus may also include a locus optimization unit configured to optimize the robot movement path generated by the movement path generation unit, based on a movement time for the robot to move along the movement path and based on the acceleration of each shaft of the robot.

In this configuration, the locus optimization unit optimizes the robot movement path in a manner to reduce the movement time and regulate excessive acceleration.

In the above aspect, the apparatus may also include a first visual sensor configured to obtain time-varying images of the first workpiece and the fingers or arms of the human working on the first workpiece, and a first feature point extraction unit configured to extract the feature points of the first workpiece from an image obtained by the first visual sensor. The movement path extraction unit may be configured to extract the movement path of the fingers or arms of the human from the images obtained by the first visual sensor.

In this configuration, the first visual sensor obtains time-varying images of the first workpiece and the fingers or arms of the human, the movement path extraction unit extracts the movement path of the fingers or arms of the human from the obtained images, and the first feature point extraction unit extracts the feature points of the first workpiece from the obtained images.

In the above aspect, the apparatus may also include a second visual sensor configured to capture an image of the second workpiece, and a second feature point extraction unit configured to extract the feature points of the second workpiece from the image obtained by the second visual sensor.

In this configuration, the second visual sensor obtains an image of the second workpiece, and the second feature point extraction unit extracts the feature points of the second workpiece from the obtained image.

In the above aspect, the human working on the first workpiece may be performed within a virtual space.

This eliminates the need for a real work environment for the first workpiece and the human, and allows the movement path of the human fingers to be extracted when the human within the virtual space works on and moves a first workpiece created by software.

In the above aspect, the apparatus may also include a storage unit configured to store the feature points of the second workpiece and the robot movement path in association with each other.

This improves the working efficiency by reading the robot movement path from the storage unit when the second workpiece is worked on again.

Another aspect of the present invention is a robot system including: a plurality of robots; a plurality of controllers configured to respectively control the robots; a network configured to connect the controllers; and the above robot movement teaching apparatus connected to the network.

This aspect allows the controllers for the robots to read the movement path of each robot from the storage unit of the movement teaching apparatus over the network based on the feature points of the second workpiece, and the robots can share information among them.

Still another aspect of the present invention is a robot controller including the robot movement teaching apparatus. The second feature point extraction unit is configured to extract positions of the feature points of the second workpiece at predetermined intervals. The robot controller includes a position/posture calculation unit configured to update an equation of motion of each feature point at the predetermined intervals based on the extracted positions of the feature points, and calculates a position or posture of the second workpiece based on each feature point position calculated from the corresponding updated equation of motion. The robot controller controls the robot based on the second workpiece position or posture calculated by the position/posture calculation unit, and thereby causes the robot to follow the second workpiece.

According to this aspect, the second feature point extraction unit extracts the positions of the feature points of the second workpiece at the predetermined intervals from the images obtained by the visual sensor. The position/posture calculation unit then updates the equation of motion of each feature point at the predetermined intervals based on the positions of the feature points extracted by the second feature point extraction unit. The position/posture calculation unit also calculates the positions of the feature points again from the updated equations of motion, and calculates the position or posture of the second workpiece based on the calculated feature point positions. The robot controller then controls the robot based on the second workpiece position or posture calculated by the position/posture calculation unit, and thereby causes the robot to follow the second workpiece.

In this manner, the equation of motion of each feature point is updated at the predetermined intervals, and thus the equation of motion of the second workpiece can be established online. This allows the robot to accurately follow the second workpiece moving even at random.

REFERENCE SIGNS LIST 1 robot system
2 robot
3 robot controller
10 movement teaching apparatus
11 first camera (first visual sensor)
12 second camera (second visual sensor)
14 movement path extraction unit
15 first feature point extraction unit
16 second feature point extraction unit
17 mapping generation unit
18 movement path generation unit
W1 first workpiece
W2 second workpiece
A, A' movement path
F finger
H human

The invention claimed is:

1. A robot movement teaching apparatus comprising:
a processor configured to:
process time-varying images of a first workpiece and fingers or arms of a human working on the first workpiece, and thereby extract a movement path of the fingers or the arms of the human;
generate a transform function for transformation from the first workpiece to a second workpiece based on feature points of the first workpiece and feature points of the second workpiece, the second workpiece being worked on by a robot; and
generate and optimize a movement path of the robot based on the extracted movement path of the fingers or the arms of the human and based on the generated transform function,
wherein optimization of the movement path of the robot comprises minimizing a value of a function of a movement time for the robot to move along the generated movement path and an acceleration of each shaft of the robot.

2. The robot movement teaching apparatus according to claim 1, further comprising:
a first visual sensor configured to obtain time-varying images of the first workpiece and the fingers or the arms of the human working on the first workpiece,
wherein the processor is configured to:
extract the feature points of the first workpiece from an image obtained by the first visual sensor; and
extract a movement path of the fingers or the arms of the human from the images obtained by the first visual sensor.

3. The robot movement teaching apparatus according to claim 1, further comprising:
a second visual sensor configured to capture an image of the second workpiece; and
wherein the processor is configured to extract the feature points of the second workpiece from the image obtained by the second visual sensor.

4. The robot movement teaching apparatus according to claim 1, wherein
the human working on the first workpiece comprises an interaction of the human with a virtual space.

5. The robot movement teaching apparatus according to claim 1, further comprising:
a storage unit configured to store the feature points of the second workpiece and the robot movement path in association with each other.

6. A robot system comprising:
a plurality of robots;
a plurality of controllers configured to respectively control the robots;
a network configured to connect the controllers; and
the robot movement teaching apparatus according to claim 5, the apparatus being connected to the network.

7. A robot system comprising:
the robot movement teaching apparatus according to claim 3; and
a robot controller that controls the robot,
wherein the processor is configured to extract positions of the feature points of the second workpiece at predetermined intervals,
wherein the robot controller is configured to:
update an equation of motion of each feature point at the predetermined intervals based on the extracted positions of the feature points;

calculate a position or posture of the second workpiece based on each feature point position calculated from the corresponding updated equation of motion; and control the robot based on the calculated position or posture of the second workpiece, and thereby cause the robot to follow the second workpiece.

\* \* \* \* \*